United States Patent Office 3,215,646
Patented Nov. 2, 1965

3,215,646
METHOD OF FOAMING AN OLEFIN COPOLYMER CONTAINING ETHYLENE
Webster M. Sawyer, Jr., Orinda, Warren C. Simpson, El Cerrito, and Geza S. Ronay, Oakland, Calif., assignors to Shell Oil Company, New York, N.Y., a corporation of Delaware
No Drawing. Filed May 11, 1962, Ser. No. 194,197
8 Claims. (Cl. 260—2.5)

This invention relates to novel processes for producing vulcanized foams of certain synthetic elastomers. More particularly, it relates to processes for producing foamed products of elastomers that are essentially free of ethylenic unsaturation.

In copending application Serial No. 88,272, filed February 10, 1961, there are described and claimed processes for preparing vulcanized foam, or cellular products, of synthetic copolymers of mono-alpha olefins having up to six carbon atoms wherein the copolymer is essentially free of ethylenic unsaturation. In that case, briefly, a latex of the unsaturated copolymer is treated to prepare a stable froth after which the froth is subjected to ionizing radiation whereby cross-linking and vulcanization takes place. The products obtained are indeed suitable vulcanized foam. As it happens, it is also desirable to produce suitable vulcanized foams by chemical means rather than by the use of ionizing radiation since sources of radiation are not readily available. The copolymers referred to are copolymers of mono-alpha-olefins having up to 6 carbon atoms and representative elastomers are the copolymers of ethylene and propylene. Because the copolymers are free, or essentially free, of ethylenic unsaturation there are no sites at which vulcanization can take place by the conventional means that are applied to unsaturated polymers.

It is an object of this invention to provide processes for producing vulcanized foams of certain saturated synthetic elastomers. More particularly, it is an object of this invention to provide chemical processes for producing vulcanized cellular, or foam products, of certain saturated copolymers. It is still another object of this invention to provide the necessary intermediate products and processes, such as a novel latex required for the preparation of the novel and improved vulcanized foam. It is yet another object of this invention to provide feasible procedures for the preparation of novel foam products of saturated elastomers. Other objects will become apparent as the description of the invention proceeds.

These and other objects are accomplished by first providing a novel latex of the saturated synthetic elastomers, which latex permits the use of suitable free-radical initiators which are not inactivated by the ingredients needed in subsequent processing. Thereafter, the latex suitably formulated, is frothed and vulcanized to yield a product having specified physical characteristics.

In this description whenever reference is made to "elastomeric copolymers of mono-olefins," or words of similar meaning, it will be understood that copolymers of at least two olefins of the formula $CH_2=CHR$ where R is hydrogen or an alkyl radical having up to 4 carbon atoms are intended. Representative mono-olefins include ethylene, propylene, butene-1, pentene-1, hexene-1, 4-methylpentene-1, and the like. Representative elastomeric copolymers include ethylene-propylene, ethylene-butene-1, ethylene-pentene-1, propylene-hexene-1, and the like. In the preferred embodiment, the elastomers are prepared with ethylene and one other mono-olefin having up to 6 carbon atoms, and particularly preferred are copolymers of ethylene and propylene. For the sake of brevity and because the present invention applies equally to the elastomeric copolymers of the type mentioned above, the invention will be described mainly as it relates to the most preferred embodiment, i.e., ethylene-propylene elastomeric copolymers.

As the total procedure involves a plurality of interdependent operations in a specified order, it will be useful to describe the invention in the order in which the procedures are undertaken.

*The saturated elastomer*

The elastomeric copolymers may be prepared from a mixture of the monomers, as ethylene and propylene, in the presence of an inert hydrocarbon solvent. The ratio of the monomers that is maintained during the polymerization will vary depending upon the proportion of the respective monomers desired in the final product and this, in turn, may vary depending upon the choice of physical properties desired. For the purposes of this invention the elastomeric copolymer should contain a relatively high proportion of polymerized ethylene, i.e., in the order of 60 to 80 mole percent with the balance being the other olefin. Because the monomers do not polymerize at the same rate, the ratio of the starting mixtures of monomers is not the same as that desired in the final product, and this is an important consideration. Table I indicates variations of ethylene units in the final elastomer as the ratio of ethylene to propylene in the starting mixture is varied. For this table, polymerizations were conducted at 45–65° C. in heptane solvent and the catalyst was the reaction product of trihexyl aluminum and vanadium oxychloride in a mole ratio of 3.0:1.

TABLE I

| Mole percent ethylene in feed gases: | Mole percent ethylene in copolymer |
|---|---|
| 8.0 | 24.0 |
| 18.0 | 48.1 |
| 26.0 | 57.7 |
| 32.0 | 62.4 |
| 50.0 | 80.3 |

Another feature of the polymerizations is that the copolymers are produced by solution polymerizations so that at the end of the polymerization the desired copolymer is dissolved in the normally liquid inert hydrocarbon solvent which may be aliphatic, aromatic or naphthenic. Further information on the preparation of the copolymers may be found in Irish patent application 695/56, published January 9, 1956, and reference is made thereto for detail that is common to this application, which detailed matter is incorporated here by reference. From the hydrocarbon solution of the copolymers prepared as indicated above, and in the Irish patent application, the novel emulsions, latices and foamed products are prepared.

*Emulsions of the elastomeric copolymers*

Essentially, the preparation of the stable emulsions comprises homogenizing the solution of the elastomeric copolymer together with an emulsifying agent and water. It is better if the intrinsic viscosity (I.V.) of the elastomeric copolymer not exceed about 10.0 (measured in Decalin at 150° C.). The concentration of the elastomer in the inert hydrocarbon solvent is not critical either but it should preferably not exceed about 30% by weight because of high viscosity. If it is much higher, difficult material handling problems arise. For this invention more desirable products are obtained when the I.V. ranges from 3.0 to 7.0 with 4.0 to 5.0 being more preferred.

The homogenization of the solution of the copolymer with the emulsifying agent and water is best accomplished by vigorous homogenization as, for example, in a colloid mill. However, in this description an Eppenbach homomixer is employed throughout. The mixing schedules range from about one-half to ten minutes depending mainly on such factors as the volume of material within the homogenizer, the concentration of the copolymer in the hydrocarbon solvent, the emulsifier and the efficiency of the homogenizer. The homogenizing step may be beneficially carried out initially at low speeds and then at higher speeds for a period of two to three minutes or longer. Alternatively, the emulsions may be prepared by charging the ingredients into the homogenizer but withholding a portion of the emulsifying agent. The balance then may be added after the emulsification has begun. By this procedure, sufficient emulsifying agent is withheld so that initially a water-in-oil emulsion is formed with the oil (elastomer solution in this case) being in the continuous phase. Upon the addition of the balance, inversion takes place and an oil-in-water emulsion is formed, and it is essential that the final emulsion be oil-in-water. If desired, the oil-in-water emulsions may be prepared directly by adding all the emulsifier at once.

The amount of water contained in the emulsion is not critical except that sufficient water should be present to permit the emulsification to be conducted easily. The total water employed may range from about 25 to about 75% by weight, although amounts from 40 to 60% are more often preferred.

Particle sizes of the oil-in-water emulsions are not critical insofar as the stability of the emulsions are concerned. The particle sizes, however, are a more important consideration for the preparation of concentrated latices as starting material for the more desirable foamed elastomers. Generally, it is preferred that the particle sizes be small. In this regard the average particle size in the oil phase may range from about 0.2 micron to about 10 microns, depending upon the homogenization technique, the particular emulsifier and its amount, the concentration of the elastomeric copolymer, and other considerations which reflect upon the degree and extent of agitation during emulsification.

The emulsifying agents employed in the preparation of the emulsions are critical in that only neutralized soap of long chain fatty acids may be employed. Among the more preferred emulsifying agents are the potassium and sodium soaps of long-chain fatty acids with the potassium soaps being particularly preferred. Among the suitable soaps there may be mentioned the posassium, or sodium salts of rosin acids, oleic acid, palmitic acid, stearic acid, lauric acid, myristic acid, archidic acid, castor acids, and other acids having from 12 to 24 carbon atoms. Of the numerous soaps examined, a particular preference is expressed for the neutralized potassium soaps of, e.g., rosin acid. When the emulsifying agent is other than a neutralized soap then interference and reaction takes place with some of the other ingredients that are needed in the subsequent processing.

Commercial rosin acid soaps frequently contain unsaponified rosin acids. The amount of such free acids can be determined by potentiometric titrations with standardized sodium hydroxide solution using a pH meter. Thus, prior to emulsification such soap solutions are neutralized by the addition of KOH equivalent in amount to the free acid determined. The importance of neutralizing the free rosin or fatty acids in the soaps derived from them can be shown by adding known amounts of such acids to their neutral soaps. The extent of coagulation found in latices made with such mixtures is found to be related to the amount of free acid added. This is illustrated with the following experimental results obtained by standardized centrifugations at 14000× gravity (maximum) for 20 minutes in a servall centrifuge. It is apparent from the results that free soap acids (rosin and oleic) interfere with the adsorption of sufficient number of soap ions on the latex particles to prevent coagulation under centrifugal compression.

EFFECT OF FREE SOAP ACIDS ON THE STABILITY OF THE LATICES

| Run No. | Mole percent Ethylene | I.V. | Soap Conc., g./g. Latex | Free Acid Conc., g/g Latex | Coagulation percent, by weight of elastomer |
|---|---|---|---|---|---|
| 1 | 62 | 3.1 | $1.24\times10^{-2}$ | $1.34\times10^{-3}$ | 14.4 |
| 2 | 62 | 3.1 | $1.40\times10^{-2}$ | 0 | 0 |
| 3 | 71.5 | 3.6 | $1.42\times10^{-2}$ | $3.8\times10^{-3}$ | 37 |
| 4 | 71.5 | 3.6 | $1.48\times10^{-2}$ | $1.26\times10^{-3}$ | 2.8 |
| 5 | 69.5 | 4.7 | $1.10\times10^{-2}$ | $3.31\times10^{-3}$ | 26 |
| 6 | 69.5 | 4.7 | $^1 1.1\times10^{-2}$ | $^1 1.06\times10^{-3}$ | 21.4 |
| 7 | 69.5 | 4.7 | $1.33\times10^{-2}$ | 0 | 0 |
| 8 | 70.0 | 5.0 | $1.31\times10^{-2}$ | $4.42\times10^{-3}$ | 6.2 |
| 9 | 70.0 | 5.0 |  | $^1 1\times10^{-3}$ | 1.9 |
| 10 | 70.0 | 5.0 | $1.34\times10^{-2}$ | 0 | 0 |

$^1$ Oleic acid.

Because of foaming considerations, it is advantageous to employ the soap in an amount as low as the system will reasonably permit and in this regard it appears that emulsification may be suitably obtained with as little as about 2.5% by weight of soap based on the weight of the elastomer. Any amount in excess of that required to produce emulsification may be employed, but amounts in excess of about 20–60% by weight of elastomer will not normally be required. With the more preferred soaps, i.e., neutralized potassium rosin acid soaps, amounts preferably range from about 5.0 to about 50.0% by weight of the elastomer.

The latices

The main use of the emulsion is as an intermediate for the production of latices of the elastomer. Dilute latices are obtained when the solvent and unreacted monomers are removed from the emulsion and this may be accomplished by any of a number of techniques. The greatest difficulty encountered in the removal of the solvent is the problem of foaming, and it is found that the emulsions are suitably flashed by the use of flashing apparatus in the form of a flask, or a similar piece of apparatus, attached to a vertical column with a side arm at the top leading to a condenser; the column serves to contain foam. Desirably the container holding the emulsion and the top and bottom portions of the column are heated. If desired, heated nitrogen at temperatures in the order of 40–80° C. may be bubbled into the emulsion through a sintered disc. Steam may be used in place of the nitrogen and is generally equally suitable. The stripping operation is suitably conducted at temperatures within the vessel containing the emulsion in the order of 25–70° C.; the column temperature may range from 30–50° C. at pressures ranging from atmospheric to a vacuum of about 16 inches of Hg.

The resulting product is a dilute latex. The excess water must be removed to produce a latex having the desired high solids content. Suitable concentrated latices can be obtained by centrifuging, and as a representative illustration, a dilute latex containing 5.6% solids may be concentrated to 63% by weight solids with 15% of the total polymer in the serum phase in an average field of 8020×gravity (21,700 r.p.m.). The centrifuging will also separate emulsifier in the same proportion that it is contained in the aqueous phase. For this concentration the presence of excess soap is not detrimental. In fact, the centrifugal concentration removes any excess soap used in emulsification and renders it available for reuse in emulsification.

The size of the latex particles is smaller than the particle size of the parent emulsions because of the removal of the solvent. The average particle size of the stripped latices range from 0.1 to 4.0 microns although it may be larger or smaller depending on the variables previously mentioned. The solids content of the concentrated latex may vary also but the desirable range is from about 50 to 75%, by weight. For preparation of foam products, the best results are obtained when the solids content is in the order of about 58 to 67% by weight. While in practice there are other ways of preparing the concentrated latices from the dilute latices they are found to be unsuitable for purposes of this invention. The addition of creaming agents will, indeed, effect concentration of the latex but such agents will have an adverse effect on the subsequent processing. Actually, the subsequent processing which involves frothing, gelation and curing, is so sensitive that material variations in process technique will produce foamed products which are undesirable by reason of physical properties and/or poor cell structure.

Since the frothing step requires suitable frothing agents and froth stabilizers and the gelation steps require suitable gelling agents, the use of prior techniques for preparing vulcanized foams of unsaturated elastomers is found to be wholly unsuitable for the saturated copolymers and other elastomers that are low in unsaturation.

*The foamed elastomer*

In order to produce an acceptable foamed product of these unusual elastomers, it is required that the preparation conforms, in some measure, to existing technology insofar as gelation times and temperatures are concerned. Further, vulcanization cycles should be as near as possible to those employed by the trade with other elastomers, i.e., 100° C. for one hour or less. A central problem in preparing vulcanized foam from the concentrated latex is to achieve adequate rates of production of sufficient sites in the latex particles through which vulcanization can take place. The production of these sites must take place during or subsequent to the primary agglomeration and coalescence caused by gelation. This is because the elastomer foams of the prior art already contain the needed sites for vulcanization whereas in the present case they must be created and maintained without interference from other ingredients that are needed for the frothing and gelation steps. For these reasons, vlucanizable sites are produced on the latex particles with a peroxide, including hydroperoxides, having a half-life at 100° C. of less than about 0.75 hour. Additionally, the peroxide must not be harmful to or be harmed by other ingredients that are employed. Finally, the peroxide must be dispersible or made dispersible among the latex particles. Among the peroxides which meet these requirements there may be mentioned diluaryl peroxide, distearyl peroxide, benzoyl peroxide, succinic acid peroxide and the like. Thus, benzoyl peroxide has a half-time at 100° C. of 0.4 hour; lauryl peroxide is 0.14 hour and succinic acid peroxide is 0.22 hour.

There are various procedures for incorporating the peroxide into the latex depending on its physical state and physical characteristics. A normally liquid organic peroxide or a solid peroxide may be added to the latex by first dissolving it in a suitable solvent such as a lower, normally liquid alcohol, an aromatic solvent such as benzene, toluene and the like or other suitable solvents such as acetone, cycloaliphatic compounds and the like. It is more preferred, however, when this procedure is employed, to use solvents having boiling points lower than that of water to facilitate the evaporation of said solvent after the peroxide is added. Alternatively, normally liquid organic peroxides or solutions of peroxide may be incorporated into the latex by adding it to the latex in form of an aqueous emulsion in which event the water and emulsifying agent used become part of the total formulation and suitable allowance therefore should be made when the emulsions are being prepared.

A solid or liquid peroxide may be merely added into the latex with agitation, whereby a dispersion is obtained after agitating. However, such dispersions are difficult to prepare with particle sizes sufficiently small to produce a uniform degree of vulcanization in the finished product. Another feature of this invention is the process of producing peroxide dispersions within the latex which give rise to a uniform dispersion of the peroxide for the production of vulcanization sites. Some solid peroxides will not form dispersions very readily and various modifications may be used. An example of a difficult dispersible peroxide is dilauroyl peroxide which is a waxy material. To employ this peroxide it may be melted and suitable surface active agents added to the melt. Thus, when this melted mixture is added to the warmed latex the combination of surface active agents in the latex and the melt will cause the peroxide to spontaneously emulsify in situ. For a peroxide such as succinic acid peroxide, it is first necessary to neutralize the acid radicals by forming, for example, a sodium or potassium salt or an ester or alcohol. The neutralized succinic acid peroxide, with the active peroxide radicals intact, is added to the latex, with agitation.

The more preferred peroxide is benzoyl peroxide, a normally granular solid, which may be added as a solution as described above. However, as an additional step is required to remove the solvent, a special process has been developed to provide for the incorporation of benzoyl peroxide and similar peroxides. This involves the preparation of a wet ground suspension wherein an aqueous suspension of about 1 to 5% by weight of clay in water is first prepared together with about 0.1 to 1% by weight of a surface active agent. The peroxide is then added and the mixture is ground in order to thoroughly disperse the peroxide in the clay. At this point, caution must be exercised to maintain the grinding composition wet as benzoyl peroxide may react spontaneously when dry. The clays that may be employed embrace any of the large class of silicates having high surface areas and which are commonly employed as suspending agents, as diluents and carriers for agricultural chemicals and numerous other uses. In addition to clays, methyl cellulose may be employed in place thereof or combined therewith. The advantages of the wet ground clay suspension of the organic peroxides are important and it, accordingly, comprises a particularly novel composition of the present invention.

The amount of peroxide that is employed varies depending on such considerations as the percentage of polymerized ethylene in the copolymer, the intrinsic viscosity, the particular peroxide used and the cycle used for vulcanization. The amount, accordingly, may vary from 1 to 10 parts per hundred of elastomer (phr.). It will appear hereinafter that the amount of peroxide employed affects the physical properties of the vulcanized foam and adjustments in peroxide levels may be beneficially made to produce a foamed product having a cross-link density ranging from about 0.4 to about $1.2 \times 10^{-4}$ moles per cc.

The peroxide functions, as indicated above, to introduce sites on the saturated copolymer through which vulcanization can take place. These sites are alone adequate to produce cross-linking in these elastomers of low unsaturation. However, it is recognized in the art that superior vulcanizate properties are obtained when sulfur is used in the vulcanization. In this process 0.5 to 5.0 phr. of sulfur is added to the latex in the form of an aqueous dispersion.

The frothing step requires the employment of a froth stablilizer and is this regard the class of prior art amine-containing froth stabilizers may not be used as they react and interfere with the function of the peroxide. A suitable froth stabilizer for the purposes of this invention is found to be a mixture of a quaternary ammonium salt and an alkali metal salt of a long chain fatty acid in molar proportions ranging from about 30 to 70 respectively to about 70 to 30 respectively. A representative composition is that which is formed by mixing together about equimolar amounts of dodecyltrimethyl ammonium chloride with potassium oleate. Equivalent materials may also be employed. Thus, instead of dodecyltrimethyl ammonium chloride, decyltriethyl ammonium chloride may be used as well as other quaternary ammonium salts wherein the portion having the larger number of carbon atoms may have from 8 to 24 carbon atoms and the short-chained alkyl radicals may have from 1 to 6 carbon atoms. Instead of potassium or sodium oleate, the corresponding stearates, laurates and similar salts of long chain fatty acids may be used. The amount of the foam stabilizer used is quite small and ranges from about 0.05 to about 2.0 phr.

At this stage the concentrated latex contains the added peroxide, vulcanizing agent and foam stabilizer. It is immaterial in which order they are added. The mixture is gently, but thoroughly, blended for a few minutes after which a froth is prepared by whipping in any suitable apparatus such as a Hobart kettle. The resulting froth, which is obtained in a few minutes, is refined to break large bubbles after which the gelling agent, sodium silicofluoride, is added. The amount of gelling agent will control the gel time and a sufficient quantity should be used to give gel times of less than about ten minutes, and accordingly, from about 0.5 to 3.0 phr. is sufficient. Zinc oxide, which is commonly used in formation of prior art foams, serves no useful function for the present foams and it is omitted. The froth, now containing the gelling agent, is again whipped for a few minutes, refined again and poured into molds. After the froth gels, the molds are placed in suitable steam ovens and the froth is vulcanized at about 100° C. The time required to obtain a suitable vulcanized foam will vary depending on the variations in the formulations but times from about 20 to 60 minutes usually are employed.

The resulting products, as previously indicated, will have varying properties depending on the formulation employed. Table II sets forth a representative latex formulation and the properties of the resulting foam.

TABLE II

[Latex, 65.8% by weight total solids, elastomer, ethylene-propylene copolymer, 69.5 mole percent polymerized ethylene, I.V. 4.7 dl./gm., 100 parts]

| | | |
|---|---|---|
| Sulfur, phr | 0.5 | |
| QAS-KFA,[1] phr | 0.4 | |
| Neutralized potassium rosinate, phr | 1.7 | |
| Benzoyl peroxide,[2] phr | 1.3 | |
| Sodium silicofluoride, phr | 1.0 | |
| Gel time, minutes | 1.0 | |
| Cure time, minutes at 100° C | 30 | 60 |
| Density, gm./l | 190 | 196 |
| 25% compression deflection, p.s.i | 1.69 | 2.10 |
| Tensile strength, p.s.i | 11.9 | 17.9 |
| Elongation at break, percent | 230 | 240 |
| Volume shrinkage, percent | 8 | 7 |
| Cross-link density, moles/cc.×10⁴ | 0.47 | 0.95 |

[1] Quaternary ammonium salt-potassium fatty acid (dodecyl trimethyl ammonium chloride-potassium oleate in 1:1 mole ratio).
[2] As wet ground suspension.

The vulcanized foams of Table II have moderately coarse cell structures but the cell structure and physical properties can be easily varied. Table III illustrates various modifications in proportions and the effect on the vulcanized foams. In these runs the resulting foams are of lower density and large cell structures are obtained as a consequence of the low concentration of froth stabilizer.

TABLE III

| Run No | 1 | 2 | 3 |
|---|---|---|---|
| Latex,[1] parts | 100 | 100 | 100 |
| Sulfur, phr | 0.5 | 0.5 | 0.5 |
| QAS-KFA, phr | 0.4 | 0.4 | 0.4 |
| Neutralized potassium rosinate, phr | 2.1 | 2.6 | 2.6 |
| Benzoyl peroxide,[1] phr | 1.8 | 1.4 | 4.0 |
| Sodium silicofluoride, phr | 1.25 | 1.25 | 1.25 |
| Gel time, minutes | 1.0 | 1.3 | 2.0 |
| Cure time, minutes at 100° C | 90 | 90 | 60 |
| Shrinkage,[2] percent | | 12 | 14 |
| Density, g./l | 121 | 114 | 126 |
| 25% compression-deflection, p.s.i | 0.67 | 0.60 | 0.97 |
| Tensile strength, p.s.i | 7.5 | 6.5 | 7.2 |
| Elongation, percent | 330 | 400 | |
| Cross-link density, moles/cc.×10⁴ | 0.53 | 0.44 | 0.36 |

[1] As in table II.
[2] After vulcanization and drying.

Table IV illustrates some variations wherein higher concentrations of froth stabilizers are used; the resulting vulcanized foams have densities comparable or lower than those of Table III but much smaller cell size. This is a result of the increased concentration of froth stabilizer.

TABLE IV

| Run No | 1 | 2 | 3 |
|---|---|---|---|
| Latex,[1] parts | 100 | 100 | 100 |
| Sulfur, phr | .75 | 0.75 | 0.75 |
| QAS-KFA, phr | 1.1 | 1.1 | 1.5 |
| Neutralized potassium rosinate, phr | 2.64 | 2.64 | 2.64 |
| Benzoyl peroxide,[1] phr | 3.3 | 3.6 | 3.8 |
| Sodium silicofluoride, phr | 1.00 | 1.00 | 1.00 |
| Gel time, minutes | 3.0 | 2.8 | 3.5 |
| Cure time, minutes at 100° C | 30 | 60 | 30 |
| Shrinkage,[2] percent | 8 | 14 | 11 |
| Cell size | Fine | Fine | Fine |
| Density, g./l | 113 | 83 | 83 |
| 25% compression-deflection, p.s.i | .31 | 0.26 | .33 |
| Tensile strength, p.s.i | 4.8 | 3.0 | 4.1 |
| Elongation, percent | 240 | 195 | 270 |
| Cross-link density, moles/cc.×10⁴ | 0.6 | 1.01 | 0.9 |

[1] As in table II.
[2] After vulcanization and drying.

From the foregoing, it will be seen that the proportions of the ingredients may be varied widely as well as varying equivalent materials. This will, as shown, affect the physical properties. The variations in tensile strength, which is one of the more important properties, can be most suitably established by variation in the cross-linked density and it is found that maximum tensile strengths are developed when the cross-link density is between about 0.4 to about $1.2 \times 10^{-4}$ moles per cc., and the peak being at about 0.6 to about $1.0 \times 10^{-4}$ moles per cc.

*Cross-link density of the foams*

Persons skilled in the art know that cross-link density values are not applied, heretofore, to foam rubbers. The reason for this is that no suitable means was available for such determinations because the determination of the cross-link densities of a rubber sample requires the immersion of the sample in a hydrocarbon solvent for various periods of time after which the specimen is wiped dry and weighed. Foamed rubbers which have been immersed in hydrocarbon solvent cannot be suitably wiped of excess solvent and weighed because of adsorption and evaporation. Because the analysis of cross-link density of the foamed rubber is an important tool, the present invention also provides a method for determining the cross-link density of the foam product of this invention as well as other foamed or cellular rubbers. If the cross-link density of the foam specimen is not within the above-indicated range, then the product is less suitable so that modifications in the formulations and vulcanizing cycles must be undertaken in order to provide the required cross-link density. The method for determining the cross-link density of the foam is described below, but persons skilled in the art will readily appreciate that modifications in the methods may be undertaken although the ultimate result is essentially the same.

When a solvent is added to a piece of the cured foam rubber of this invention, swelling equilibrium is attained over a period of several hours; for the purposes of this description, benzene is employed as the solvent. The specimens of foam rubber for cross-link density measurements are suitably cylinders of 13/16 inches in diameter stamped from larger samples with a Kenco two-ton press. The height of the specimen varies from 3/4 to 1-inch depending on the thickness of the original foam rubber sheet. The initial dimensions, of course, of the specimen are easily determined to ±0.003 cm., but it is very difficult to measure swollen dimensions of the cylindrical test pieces because they float irregularly in the solvent owing to the presence of small amounts of trapped air. Accordingly, after swelling, the test piece is immobilized by impaling it with two common pins thrust upward through a piece of steel gauze placed in the bottom of a two-inch deep petri dish used to hold the solvent. The height and diameter are measured both before and after swelling using two Gaertner cathetometers, one with vertical travel and the other with horizontal travel. Before swelling, marks are made with ink on the edges of the piece and these serve to define the measurement locations. Thus, these marks are used only to locate the traverse of the cathetometers; the actual points of measurement are always to an edge of the specimen. The particular means employed to immobilize test specimens is not important and other means will be readily suggested as one becomes more familiar with the procedure. Thus, for example, an improved mounting platform may be constructed with leveling screws with a circular plate that fits inside a suitable vessel such as the 4-inch petri dish. In the center of the plate, two pins may be mounted for attaching the swollen specimen.

As it is necessary for the specimen to reach swelling equilibrium, a series of measurements may be made starting as soon as possible after immersion of the specimen in the solvent. About 1½ minutes may be needed to line the specimen up in the field of the cathetometer. By periodic measurements of the diameter of the swollen specimen, the calculation of the volume fraction, $V_r$, can then be determined according to the equation $V_r=$(original diameter/swollen diameter)$^3$. The cross-link density is then determined using the Flory-Rehner equation $$\nu = \frac{-1}{V_s} \cdot \frac{\ln(1-V_r) + Vr + \mu V_r^2}{V_r^{1/3} - \frac{2V_r}{f}}$$

wherein $V_s$ is the molal volume of the solvent used, i.e., 89.43 for benzene; the functionality of the cross-links; $f$ is taken as 4, and $\mu$ is the Huggins solubility parameter for the solvent-polymer pair. The value of $\mu$ is also a function of $V_r$ (i.e., $\mu=\mu_0+\beta V_r$) wherein $\mu_0$ is 0.48 and $\beta$ is 0.29. $\mu$ and $\beta$ may be found by determining the stress-strain modulus of the swollen polymer in a fashion described by Gee in Trans. Faraday Soc., 42A, 33; 42, 585 (1946). The values of the required cross-link densities take into account the non-rubbery constituents contained in the latex and a discussion of the extensive calculations involved are not undertaken here. It is sufficient to mention, however, that the influence of the non-rubbery constituents on the cross-link density is neglected.

From the foregoing discussion of the invention, various modifications will be suggested to persons skilled in the art. Thus, dipped or extruded goods, such as rubber thread, having improved physical properties can also be prepared from the latices of the saturated elastomers. The formulations for dipped goods are essentially the same as those used for foam rubber with the exception that frothing aids and the gelling agents, i.e., sodium silicofluoride, are omitted. Rapid cures in atmospheric steam may be easily obtained. The physical properties of the final vulcanized product can vary greatly by varying the formulation. The most suitable products are obtained when the cross-link density of the vulcanizate is in the same range as for the vulcanized foams.

Although the description of this invention was confined mainly to elastomeric copolymers of ethylene and propylene, the identical problems of formulation and vulcanization exist with other elastomeric copolymers which are free, or essentially free of unsaturation. Latices of copolymers of ethylene and butene-1, ethylene and pentene-1 and others wherein the second monomer has up to six carbon atoms may be handled and prepared in essentially the same way to produce vulcanized foams and dipped goods. Generally, the production of vulcanizable sites will require more peroxide so that a point is reached where the peroxide required makes the processes presently uneconomical. That point is reached with copolymers of ethylene and heptene-1 or hexene-1. These modifications, as well as others, may be readily adopted. Thus, the incorporation of fillers and reinforcing agents will modify the properties of the vulcanizates; pigments may also be used but care must be exercised as harmful side reactions may take place. Still other modifications may be adopted without departing from the spirit of the invention.

We claim as our invention:

1. The process comprising emulsifying with water and an emulsifying agent a hydrocarbon solution of an elastomeric copolymer of ethylene and one other mono olefin having up to six carbon atoms, said copolymer comprising 60–80 mol percent condensed ethylene units, the emulsifying agent free of unsaponified fatty acid being selected from the group consisting of sodium and potassium soaps of monocarboxylic acids having 12–24 carbon atoms per molecule, separating the hydrocarbon diluent followed by separating water until the solids content of the resulting latex is between 50 and 75% by weight, mixing the resulting latex with (1) a peroxide having a half-life at 100° C. of less than 0.75 hour (2) sulfur and (3) a mixture of a quaternary ammonium salt and an alkali metal salt of a long chain fatty acid in a molar ratio ranging from about 30:70 to about 70:30, thereafter whipping the mixture to a froth and adding sodium silicofluoride, further whipping and thereafter vulcanizing the froth with steam.

2. The process of claim 1 wherein the elastomer is a copolymer of ethylene and propylene.

3. The process of claim 1 wherein the emulsifying agent is neutralized potassium rosinate.

4. The process of claim 1 wherein the emulsifying agent is neutralized sodium rosinate.

5. The process for vulcanizing a latex of an elastomeric copolymer of ethylene and one other mono olefin having up to six carbon atoms, said copolymer comprising 60–80 mol percent condensed ethylene units, the latex having from 50 to 75% solids by weight and containing an emulsifying agent free of unsaponified fatty acid selected from the group consisting of sodium and potassium soaps of monocarboxylic acids having 12–24 carbon atoms per molecule, comprising mixing the latex with (1) a peroxide having a half-life at 100° C. of less than 0.75 hour, (2) sulfur and (3) a mixture of a quaternary salt and an alkali metal salt of a long chain fatty acid in a molar ratio ranging from about 30:70 to about 70:30 thereafter whipping the mixture to a froth and adding sodium silicofluoride, further whipping and thereafter vulcanizing the froth with steam.

6. The process of claim 5 wherein the elastomer is a copolymer of ethylene and propylene.

7. The process of claim 5 wherein the emulsifying agent is neutralized potassium rosinate.

8. The process of claim 5 wherein the emulsifying agent is neutralized sodium rosinate.

References Cited by the Examiner

UNITED STATES PATENTS

| Re. 23,697 | 8/53 | Stauffer | 260—2.5 |
| 2,534,078 | 12/50 | Strain | 260—79.3 |
| 2,539,931 | 1/51 | Rogers et al. | 260—2.5 |
| 2,773,053 | 12/56 | Field et al. | 260—2.5 |
| 3,055,853 | 9/62 | Pickell | 260—29.6 |

FOREIGN PATENTS

| 582,740 | 9/59 | Canada. |
| 578,584 | 7/46 | Great Britain. |
| 856,735 | 12/60 | Great Britain. |
| 229,412 | 7/60 | Australia. |

MURRAY TILLMAN, *Primary Examiner.*

LEON J. BERCOVITZ, *Examiner.*